United States Patent [19]

Nordegren et al.

[11] 4,011,838
[45] Mar. 15, 1977

[54] ELECTRONIC MILKER

[75] Inventors: Sven-Ake Nordegren, Soedertelje, Sweden; Douglas J. Norton, Red Hook, N.Y.

[73] Assignee: Alfa-Laval AB, Tumba, Sweden

[22] Filed: Mar. 25, 1976

[21] Appl. No.: 670,112

[52] U.S. Cl. .......................... 119/14.08; 119/14.44
[51] Int. Cl.² .......................................... A01J 5/04
[58] Field of Search ......... 119/14.08, 14.14, 14.41, 119/14.44, 14.01

[56] References Cited
UNITED STATES PATENTS

| | | | |
|---|---|---|---|
| 3,754,532 | 8/1973 | Troberg et al. ............... | 119/14.08 |
| 3,783,837 | 1/1974 | Olander ...................... | 119/14.08 |
| 3,878,819 | 4/1975 | Harman ...................... | 119/14.08 |
| 3,900,005 | 8/1975 | Goldsmith .................. | 119/14.41 |

*Primary Examiner*—Hugh R. Chamblee
*Attorney, Agent, or Firm*—Davis, Hoxie, Faithfull & Hapgood

[57] ABSTRACT

A milking machine system includes a flow rate sensing device, a timing device, and a system control means for varying the character of the working and massage vacuums during the milking process, in response to the rate of milk flow and to time. The milking machine system can be controlled in predetermined phases, such as a stimulation phase, a milking phase, a post-milking phase, and a switch-off phase, with the duration of the phases dependent on the rate of milk flow reaching certain predetermined levels and on time lapse parameters. The level of the working vacuum or massage vacuum can be varied in each phase with the massage vacuum pulses also variable as to pulse frequency and duration. The teat cups can also be operated independently of one another, and can be subjected periodically to sequential pulses of the massage vacuum to operate the teat cups sequentially. A system control device is included for controlling the vacuum and pulse parameters of each phase in response to the level of milk flow and lapses of time, and includes electronic logic circuitry and electronic drivers.

18 Claims, 13 Drawing Figures

ELECTRONIC MILKER

BACKGROUND OF THE INVENTION

The present invention relates to apparatus and processes for automatic machine milking, providing for a plurality of milking phases with variable milking characteristics, each phase of which can be of a duration responsive to milk flow and time.

Machine milking, as known in the art, generally utilizes teat cups and vacuum sources to perform the milking function. In such prior art systems each teat is contained within a teat cup having a teat receiving liner, inside the cup next to the teat. A working vacuum is applied through each teat cup liner to draw the milk from the teat, with the teat liners periodically opened and collapsed by applications of a massage vacuum between the liner and the inside of the cup. This periodic working of the teat liners results in the periodic flow of milk from each teat into a milk line, and constitutes the actual milking of the cow.

Prior art milking machines have generally tended to perform under an unvarying milking condition throughout the milking processes, subjecting the teats to a constant level of working vacuum and to an unvarying pulsation of the teat liners. Such an unvarying milking condition can be undesirable, both in terms of the safety for the animal being milked and in terms of the quantity and quality of the milk obtained. Specifically, it is known that prior to milking, a cow must be adequately prepared to trigger the cow's let-down relexes and cause the cow to release her milk. If the teats are subjected to too high a level of working vacuum prior to the release of the cow's milk, the full vacuum acting upon the teat with no milk flow can injure the teat and may cause the cow discomfort, decreasing her milk production. Similarly, the risk of injury is great if the teats are subjected to the working vacuum after milk flow has ceased. To avoid some of these problems, users of such prior art machines generally prepare the cow for milking by manual stimulation of the cow's teats. After adequate preparation, teat cups are applied and the cow can be milked with decreased chance of injury or discomfort to the cow. After milk flow ceases, the working vacuum must be manually terminated to avoid injury.

Some prior art milking machines have incorporated apparatus enabling machine preparation of the cow for milking, and automatic termination after milking. For example U.S. Pat. No. 3,754,532, issued Aug. 28, 1973, discloses apparatus for subjecting the teats to a relatively low working vacuum and a relatively low frequency and low level of massage vacuum for machine stimulation of the cow, thereby rendering manual stimulation unnecessary. The apparatus of that patent also monitors the rate of flow of the milk obtained, and, upon attainment of a predetermined rate of milk flow, switches the apparatus to a second phase, subjecting the teats to a higher working vacuum and to a higher frequency and level of massage vacuum for the actual milking of the cow. When the rate of milk flow decreases at the end of this milking phase, the apparatus of the patent switches to a phase which subjects the teats to the relatively low working vacuum and relatively low frequency and low level of massage vacuum until the operator turns the machine off and removes the teat cups.

Other prior art apparatus provide for automatic removal of the teat cups when the milk flow ceases at the end of the milking phase, detecting the cessation of the milk flow by a milk flow indicator and then causing the teat cups to fall by removing the vacuums from the teat cups. Other arrangements catch the teat cups and remove them from the cow. See German Pat. No. 1,278,166, and U.S. Pat. No. 2,496,307, issued Feb. 7, 1950, and U.S. Pat. No. 3,246,631, issued Apr. 19, 1966.

Prior art milking machines generally milk all the teats simultaneously, with all the teat liners being pulsated concurrently. It has been found that several advantages can be obtained over this concurrent pulsation through the use of sequential pulsation, in which the teat liners are pulsed one after the other. This sequential pulsation results in even milk flow in the milk line, minimizes the risk of carrying over infection, suppresses air mixing in the milk, lowers free fatty acids in the milk, and controls the rancidity of the milk.

As seen above, some prior art systems have utilized a rate of milk flow indicator for varying the vacuums and rates of pulsation in response to an increase or decrease in rate of milk flow. While these systems do represent advances in milking efficiency and safety, it has been found that even greater efficiencies and safety can be achieved by looking at both the rate of milk flow and the lapse of time in certain situations, or in looking at either where appropriate. For example, it has been found that it is best to switch the system from the stimulation phase to the milking phase when the rate of milk flow achieves a predetermined level. If, however, that rate of flow is not achieved after the lapse of a predetermined time, it is best to switch to the milking phase regardless for purposes of system efficiency.

As seen above, some prior art systems can automatically operate with shift phases, as in U.S. Pat. No. 3,754,532 which can shift between a low vacuum, slow pulsation phase and a high vacuum, high pulsation phase in in response to the rate of milk flow. It has been found that even greater efficiencies and safety can be achieved by a system operating with additional phases. Thus, a system according to the invention can operate in a first, stimulation phase with vacuums and pulsation rates appropriate to stimulate the cow; in a second, milking phase appropriate to milk the cow; in a third, post-milking phase appropriate to finish the milking; and in a fourth, shut-off phase appropriate after milking for the convenience of the operator.

BRIEF SUMMARY OF THE INVENTION

While the prior art apparatus present some advances toward safety for the cow and milking efficiency, the present invention provides even more desirable milking apparatus and processes. Specifically, the apparatus of the present invention includes a cluster of teat cups having teat-receiving liners for attachment to the cow, a milk line for receiving milk from the cluster, a flow rate sensing device associated with the milk line for sensing the rate of milk flow within the line, and a timing device for measuring lapses of predetermined periods of time. The teat cups are operated by a first vacuum means connected to the milk line for creating a working vacuum in the teat cups, a second vacuum means connected to the teat cups for creating a massage vacuum, and a pulsator means associated with the teat cups for subjecting the teat cups to the conditions of periodic pulses of the massage vacuum. A system control means is operatively connected to the flow rate sensing device and to the timing device for controlling the system in response to the rate of milk flow within the milk line and in response to the lapse of predetermined periods of time. Specifically, the system control means controls the level of the working vacuum, the level of the massage vacuum, and the pulsator means.

The invention thus comprises a milking machine system which can operate in several different phases, with each phase operable under particular conditions of working vacuum and massage vacuum. In addition, the duration of each phase can be adjusted in response to the rate of milk flow, to the lapse of a predetermined period of time, or both. The advantages of this system in terms of safety for the cow and efficiency of milking are numerous. For example, the first, stimulation phase, can utilize low levels of working and massage vacuums with the massage vacuum periodic pulses being of low frequency and short duration, all of which conditions serve to properly stimulate a cow for milking. The duration of this first stimulation phase can be dependent upon the rate of milk flow achieving a predetermined level, whereupon the system will switch into a second, milking phase more efficient for the actual milking of the cow. The duration of this first, stimulation phase can also be dependent upon the lapse of a predetermined period of time, so that even if the rate of milk flow has not yet achieved the predetermined level at that time, the system will nevertheless switch into the second, milking phase. This first, stimulation phase is safe for the teats since safe vacuum and pulse conditions are generally maintained until adequate milk flow is achieved. Milking efficiency is obtained by limiting the maximum time duration of the first phase, thereby ensuring that the milking machine does not run in this mode for an inordinate length of time.

After the first, stimulation phase, the system can be operated in a second, milking phase to utilize vacuums and pulse conditions selected for more efficient removal of the milk. Specifically, the system can be operated at a second working vacuum level, which can be higher than in the first, stimulation phase. This higher vacuum removes milk faster than a lower vacuum would and can be safely applied while mile is flowing from the teats. Also, the system can be operated at a second massage vacuum level, higher than the first massage level, with the periodic pulses being of a higher frequency and a longer suction period, all of which conditions serve to remove milk at a faster rate from the teats.

Since the vacuum and pulse conditions of this second, milking phase can be safely applied so long as adequate milk is flowing from the teats, the duration of this phase is determined by the rate of milk flow within the milk line. Specifically, when the milk flow falls below a predetermined level, the system will switch into a third, post-milking phase.

In the third, post-milking phase, the teats can be subjected to vacuums and pulse conditions more appropriate for the removal of any residual milk in the cow, while being safe for the teats. Specifically, the third phase can be operated at a third working vacuum level, at a third message vacuum level, and at a third condition of the pulsation. As in the first phase, these vacuums can be lower than in the second phase and therefore safer for the teats. Also, the periodic pulses can be of a lower frequency and of a shorter suction period which are also safer for the teats and more comfortable for the cow. Since the purpose of this third, post-milking phase is to remove residual milk at a low rate of milk flow, the duration of the phase is determined by the lapse of a second predetermined period of time. After that time has lapsed, the system will switch into a fourth, switch-off phase.

The purpose of the fourth, switch-off phase, is to automatically terminate all milking of the cow while retaining the teat cups on the teats for purposes of cleanliness and operator convenience. Accordingly, in the fourth, switch-off phase, the the system can be operated at a fourth working vacuum level, of sufficient level to retain the cups on the teats while posing no danger to the teats. No massage vacuum or periodic pulses need be applied since no milking action is necessary. While this phase can be dependent upon the lapse of some predetermined period of time, it can also be terminated manually by the operator as he removes the teat cups.

The invention also comprises a system containing a system control means operatively connected to a flow rate sensing device and to a time-lapse device for controlling the system in a plurality of operational phases. At least one of the phases can be of a duration determined in response to the rate of milk flow within the milk line, and at least one of the phases can be of a duration determined in response to the lapse of a predetermined period of time. For example, the system control means can control the system in a stimulation phase, as discussed above, with vacuum levels and pulse conditions appropriate for stimulating the cow for milking. The duration of this stimulation can be in response to both the rate of milk flow and to the lapse of a predetermined period of time. As a further example, the system can also be controlled in a milking phase with vacuum levels and pulse conditions more appropriate for efficient removal of the milk, of a duration determined by the rate of milk flow dropping below a predetermined level.

The system can be operated in a plurality of operational phases, including operating the system at a first level of working vacuum in at least one of the phases, and at a second level of working vacuum in at least one other of the phases. For example, as seen above the working vacuum in the stimulation phase can be relatively low for safety of the cow, and can safely be higher during the milking phase for efficient milking. The system can also be operated at a first level of massage vacuum in at least one of the phases, and at a second level of massage vacuum in at least one other of the phases. Similarly, the system can be operated at a first condition of periodic pulses of the massage vacuum in at least one of the phases, and at a second condition of periodic pulses in at least one other of the phases. For example, as seen above, in the stimulation phase the massage vacuum level can be relatively low and of a relatively low pulse frequency and short duration for safety of the cow. In the milking phase the massage level can be higher and of a higher pulse frequency and longer duration for more efficient milking.

The system also comprises an arrangement by which the teat cups can be subjected sequentially to the massage vacuum to operate the teat cups in sequential pulsation. This sequential operation of the teat cups has been found to be beneficial to the milking operation in several respects, such as resulting in even milk flow in the line, minimizing risk of carrying over infection, suppressing air mixing into the milk, lowering free fatty acids, and controlling hydrolytic rancidity. The teat cups can be operated by a pulsator means controllable by a system control means. Varying working vacuums and varying massage vacuums of varying pulse frequency and pulse period can be applied to the teat cups in a plurality of phases as described above.

DETAILED DESCRIPTION OF THE INVENTION

Figure 1:
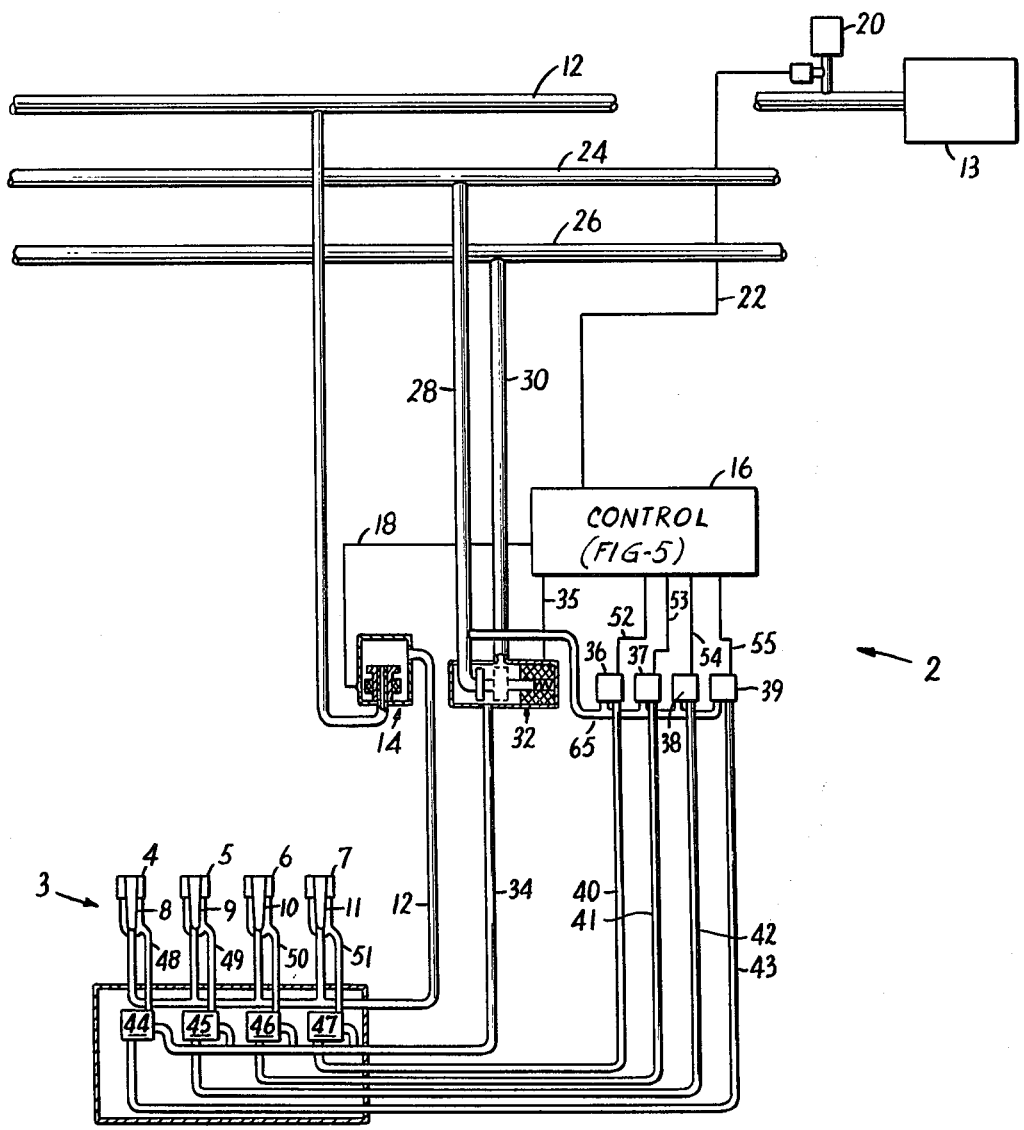
FIG. 1 is a schematic diagram of an embodiment of the milking machine.

FIG. 1 sets out an embodiment of a milking machine system under the present invention. In FIG. 1, a milking machine system 2 has a cluster 3 of teat cups 4, 5, 6 and 7, each with a teat-receiving liner, 8, 9, 10 and 11, respectively. A milk line 12 receives the milk from the cluster 3, with a flow rate sensing device 14 associated with the milk line 12 for sensing the rate of milk flow within the line. A system control means 16 is operatively connected to the flow rate sensing device 14 by electrical line 18 for controlling the system 2 in response to the rate of milk flow within the milk line 12.

The milk line 12 is under a vacuum established conventionally by vacuum pump 13, to provide a first vacuum means connected to the milk line for creating a working vacuum in the teat cups 4–7. A vacuum regulator 20 of conventional construction is electrically controllable by the system control means 16 via line 22 to regulate the vacuum in the milk line from a first vacuum level to a second level when activated. In a typical embodiment, the milk line 12 when unregulated is at a 250 mm vacuum; when regulated, it is at a 380 mm vacuum. Low vacuum line 24 and high vacuum line 26 constitute a second vacuum means connected to the teat cups 4–7 via lines 28 and 30, a changer 32, and a line 34. In a typical embodiment, line 24 is at 200 mm vacuum; line 26 is at 380 mm vacuum. The level of the massage vacuum in the teat cups 4–7 is controllable by the system control means 16, which can control the changer 32 to select between the low vacuum on line 24 by the presence of a high signal on line 35, and the high vacuum on line 26 by the presence of a low signal on line 35.

Figure 3:
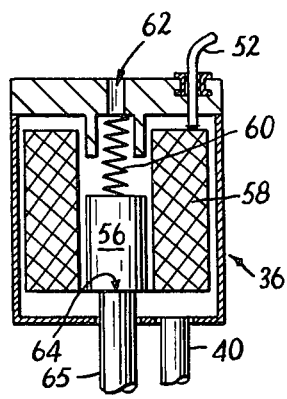
FIG. 3 is a schematic diagram of the pulsator.

The system control means 16 also controls the conditions of a pulsator means, formed of pulsators 36–39 associated with the teat cups 4–7 through vacuum lines 40–43, servo valves 44–47 and vacuum lines 48–51, respectively. Pulsators 36–39 operate the teat cups 4–7 by subjecting them to periodic pulses of the massage vacuum in response to electrical signals received from the control means 16 via lines 52–55, respectively. Specifically, and with reference to FIG. 3, each pulsator such as pulsator 36 contains a translating valve 56 movable by a solenoid 58 and spring 60 to close either aperture 62, at atmospheric pressure, or aperture 64, at the pressure of the low vacuum line 28 through connection line 65. When a low signal is present on line 52, aperture 62 is open, and line 40 is at atmospheric pressure. When a high signal is present on line 52, aperture 64 is opened and places line 40 at the 200 mm low vacuum.

Figure 4:
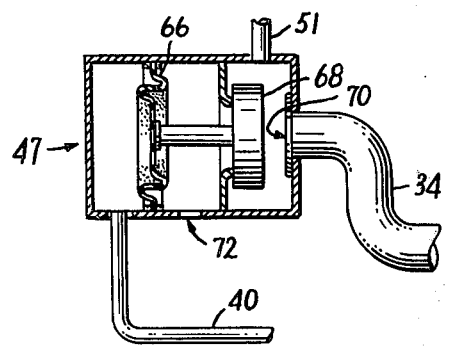
FIG. 4 is a schematic diagram of the servo valve.

This vacuum in line 40 operates the servo valve 47 as seen in FIG. 4, where it acts on diaphragm 66 to activate a piston 68. When piston 68 is activated by the presence of a low vacuum in line 40, aperture 70 is opened and the vacuum in line 34 as established by the changer 32 is established in vacuum line 51 connected to the teat cup 7, establishing the vacuum around the liner 11 within the teat cup. When atmospheric pressure is present in line 40, the piston 68 seals aperture 70, through the action of the vacuum in line 34, and atmospheric pressure from aperture 72 is established in line 51 and around the liner 11.

Figure 2:
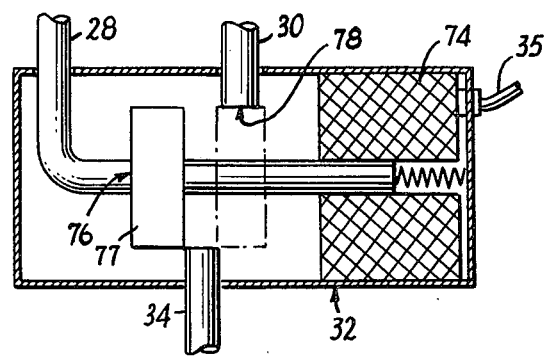
FIG. 2 is a schematic diagram of the changer.

The changer 32, as seen in FIG. 2, is controllable by the control means 16 through a solenoid 74 which can be electrically activated via line 35 to open either aperture 76 of the low vacuum line 28 or aperture 78 of the high vacuum line 30, thereby establishing such vacuum in line 34.

The flow rate sensing device in the form of a milk flow indicator 14 is contained within the milk line 12 and senses the milk flow within the line. The milk flow indicator 14 is of the type illustrated in U.S. Pat. No. 3,832,970, issued Sept. 3, 1974, and indicates by an electrical signal on line 18 whether the rate of milk flow within the line is more or less than a predetermined level. That signal on line 18 is received by the electrical control means 16 as one of the two control parameters of the system. The other control parameter is a time-lapse device for measuring lapses of predetermined periods of time and is contained within the system control means 16 in the embodiment of FIG. 1, as described below.

Figure 5:
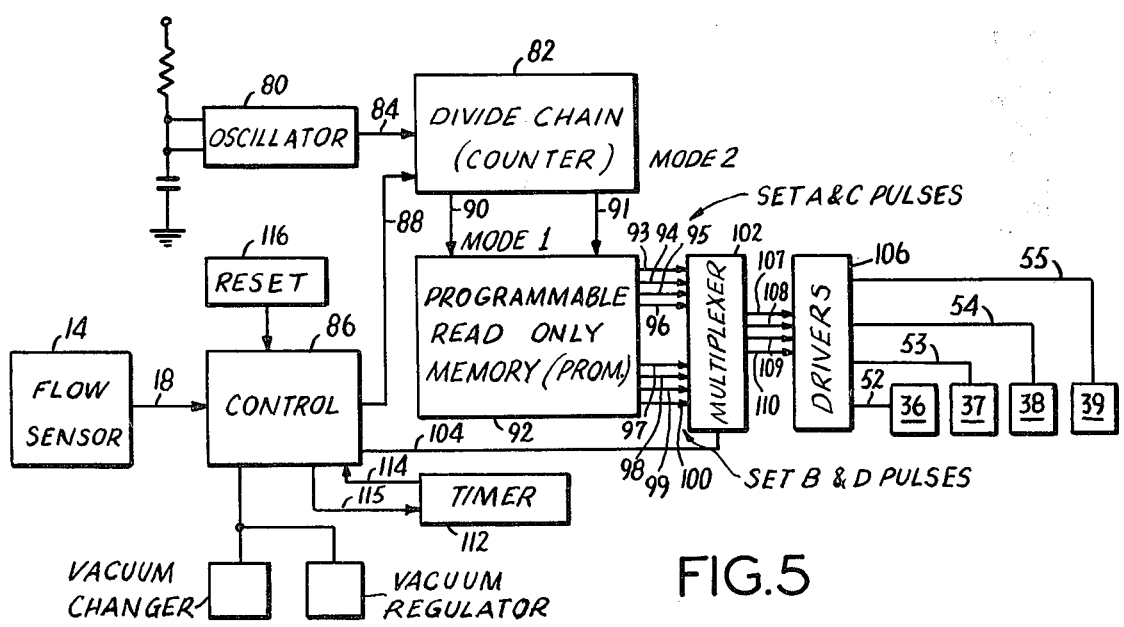
FIG. 5 is a block diagram of the control means.
Figure 6:
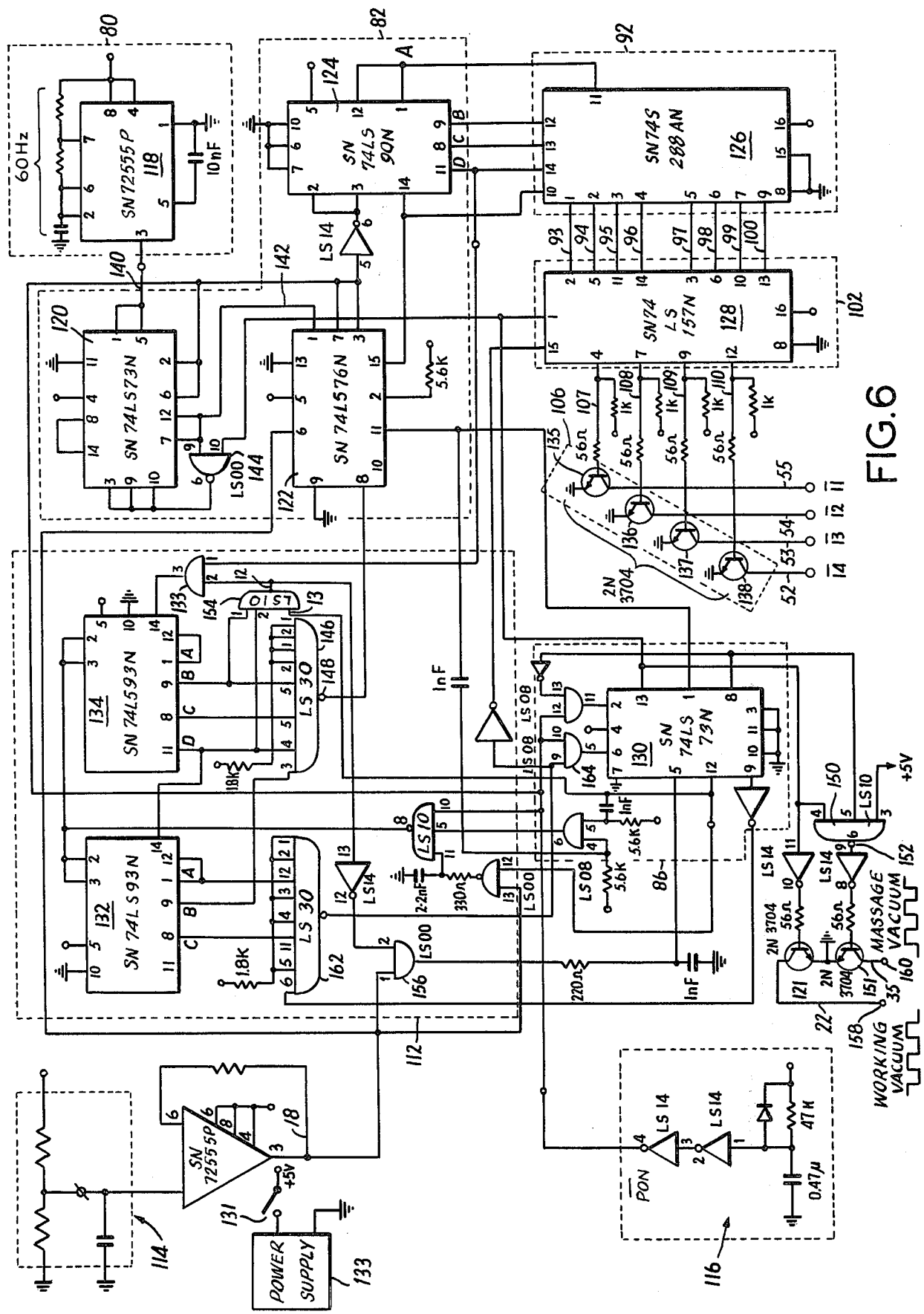
FIG. 6 is a schematic diagram of the control means.

The system control means 16 of the embodiment is illustrated in block diagram form in FIG. 5 and in schematic form in FIG. 6. With reference to FIG. 5, the control means of the preferred embodiment includes an oscillator 80 feeding a 60 Hz. signal to a counter 82 via line 84. Counter 82 is controlled by a control 86 via line 88, which places the counter 82 in either mode 1 or mode 2. In mode 1, the counter 82 generates a mode 1 pulse train and a binary coded decimal (BCD) signal to a PROM (Programmable Read Only Memory) 92 as indicated by line 90. In mode 2, the counter 82 generates a mode 2 pulse train and a BCD signal to the PROM 92 as indicated by line 91.

In response to the pulse train and BCD signal from the counter 82, the PROM 92 generates two sets of output pulse train signals, set A signals over lines 93–96 and set B signals over lines 97–100. A multiplexer 102 receives the signals from the PROM 92 and passes only one of the sets, as controlled by a signal over line 104 from control 86. The signals passed through the multiplexer 102 proceed to the drivers 106 on lines 107–110 and onto the pulsators 36–39 on lines 52–55.

A time-lapse device for measuring lapses of predetermined periods of time in the form of a timer 112 is contained within the system whereby the system control means 16 can control the milking machine system 2 in response to the lapses of predetermined periods of time. Specifically, the timer 112 is connected to the control 86 via lines 114 and 115, with the control 86 initiating the measuring of a period of time via line 115, and the timer indicating the end of such period with a signal over line 114. A reset switch 116 can be operated to reset the control 86 when desired.

Figure 7:
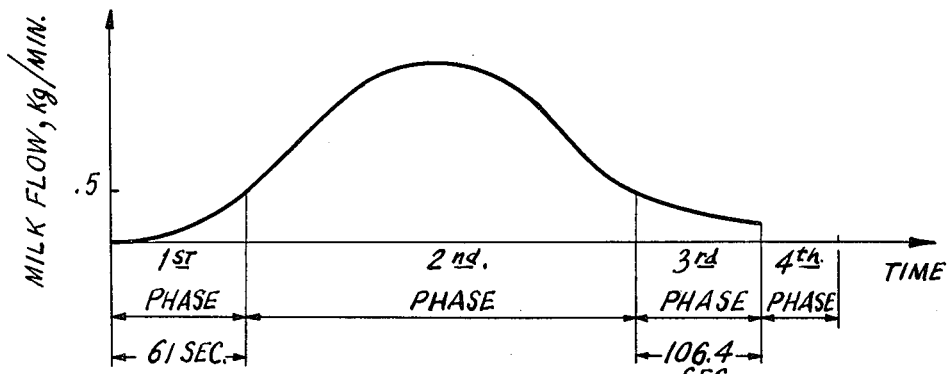
FIG. 7 is a diagram of the milk flow as a function of time.

The system control means 16 is for controlling the system in predetermined phases, thereby attaining greater milking efficiency and safety for the cow. As illustrated in FIG. 7, a graph of the milk flow versus time in the milking operation shows that the rate of milk flow gradually increases to a maximum, then gradually decreases until the cow is sufficiently empty. In the present invention, the system is initially operated in a first, stimulation phase at a first working vacuum level, at a first massage vacuum level and at a first condition of the pulsator means. The duration of the first phase is determined in response to the rate of milk flow within the milk line and in response to the lapse of a first predetermined period of time.

The general purpose of this first phase is to stimulate the cow, triggering the cow's let-down reflexes and causing the release of her milk. In the interest of safety for the cow this stimulation is best done at relatively low working and massage vaccum levels, and at a massage vacuum pulsations of a relatively low frequency and short-pulse duration. Once this stimulation is accomplished and the milk flow reaches a sufficient level, the vacuum levels and vacuum pulsations can be increased for more efficient milking. In a typical case, as illustrated in FIG. 7, the first, stimulation phase continues until the rate of milk flow reaches 0.2 kg/min. or until 61 seconds has elapsed, whichever occurs first in time. In the block diagram of FIG. 5, the control 86 reacts to the first received of either the flow rate signal on line 18 from the milk flow indicator 14 or the lapse of time signal on line 114 from the timer 112, to switch the system to a second phase.

In this second, milking phase, the system is operated at a second working vacuum level, at a second massage vacuum level, and at a second condition of the pulsator means, for a duration in response to the rate of milk flow within the milk line remaining greater than a predetermined rate. Since the purpose of this phase is to most efficiently draw the milk from the cow, and since the teats can be safely subjected to higher vacuums and pulsations when adequate milk is flowing, the teats are subjected in this phase to higher working and massage vacuum levels and to massage vacuum pulsations of a higher frequency and longer pulse duration. When the rate of milk flow decreases toward the end of the milking, the teats should be subjected to lower vacuums and less severe pulsations in the interest of safety for the cow. Accordingly, the duration of this second phase is adjusted in response to the rate of milk flow within the milk line. Typically as shown in FIG. 7, when the rate of milk flow diminishes to 0.2 kg/min., the system is switched to a third phase. As seen in the block diagram of FIG. 5, the control 86 reacts to the appropriate flow rate signal on line 18 from the milk flow indicator 14 to switch the system to a third phase.

In the third, post-milking phase, the system is operated at a third working vacuum level, at a third massage level and at a third condition of the pulsator means, for a duration in response to the lapse of a second predetermined period of time. Since the purpose of this third phase is to remove residual milk under conditions safe for the cow, the phase is best performed at relatively low working and massage vacuum levels and at massage vacuum pulsations of relatively low frequency and short pulse durations. In the preferred embodiment, the vacuum levels and pulsations are the same as in the first phase for simplicity of system design. Since the rate of milk flow will continue to diminish during this phase, the duration of this phase is dependent on the lapse of a predetermined period of time. In the typical embodiment as shown in FIG. 7, this period is set at 106.4 seconds. After this lapse of time as signaled by the timer 112, the control 86 switches the system to a fourth phase.

In the fourth phase, the system is operated at a fourth working vacuum level for a duration dependent upon manual termination. The purpose of this fourth phase is to retain the teat cups on the cow for purposes of convenience to the operator after the removal of milk has ceased. Accordingly, no massage vacuum level or pulsations are applied, and only a working vacuum level is applied to retain the teat cups on the teats. While the phase could be of a timed duration, the preferred embodiment leaves the duration dependent upon the actions of the operator.

FIGS. 10–13 illustrate the working and massage vacuums and massage vacuum pulsations applied to the teat cups for the four phases in the preferred embodiment. The first and third phases have a relatively low working vacuum of 250 mm., and massage vacuum pulses of 200 mm. vacuum, 2.67 second period, and 0.93 second width. The second phase has a higher working vacuum of 380 mm., and massage vacuum pulses of 380 mm. vacuum, 2 second period, and 1.3 second width. The fourth phase uses a working vacuum of 250 mm.

Figures 8, 9:
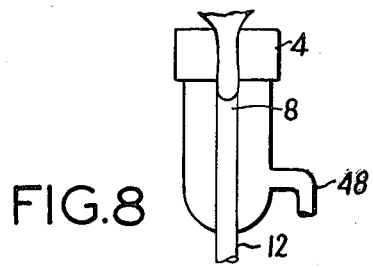
FIG. 8 is a diagram of a teat cup in a flow configuration.
FIG. 9 is a diagram of a teat cup in a rest configuration.
Figures 10, 11:
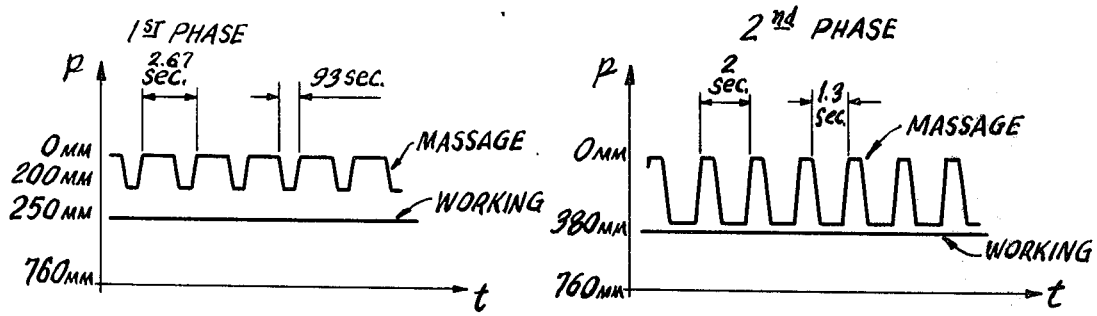
FIG. 10 is a diagram of the vacuums in a stimulation phase.
FIG. 11 is a diagram of the vacuums in a milking phase.

Pulse trains of massage vacuum pulses and continual levels of working vacuums as illustrated in FIGS. 10–13 are applied to each of the teat cups 4–7 to effectuate their milking action. As illustrated in FIGS. 8 and 9, the working vacuum present in line 12 acts upon a teat in a teat cup, such as cup 4, to draw the milk from the teat. The teat liner 8 is periodically opened and collapsed by periodic application of the massage vacuum, through the application of a train of massage vacuum pulses as shown in FIGS. 10–13. When the massage vacuum level is at atmospheric pressure, such as shown in FIG. 9, the liner 8 collapses beneath the teat due to the pressure differential from the vacuum established by the working vacuum. This collapsed liner blocks the flow of milk from the teat and blocks the vacuum from working on the teat, thereby allowing the teat to rest. The action of the liner as it collapses and opens also massages the teat, maintaining its blood flow. When a pulse of massage vacuum reaches the liner via line 48, the pressure differential is insufficient to retain the liner in a collapsed state, and the liner opens to its flow condition as shown in FIG. 8.

While the levels of working and massage vacuums and the massage vacuum pulsations could be varied in the invention for each of the phases, the preferred embodiment utilizes identical vacuums and pulsations for the first and third phases in the interest of system simplicity. Accordingly, the first phase diagram in FIG.

Figures 12, 13:
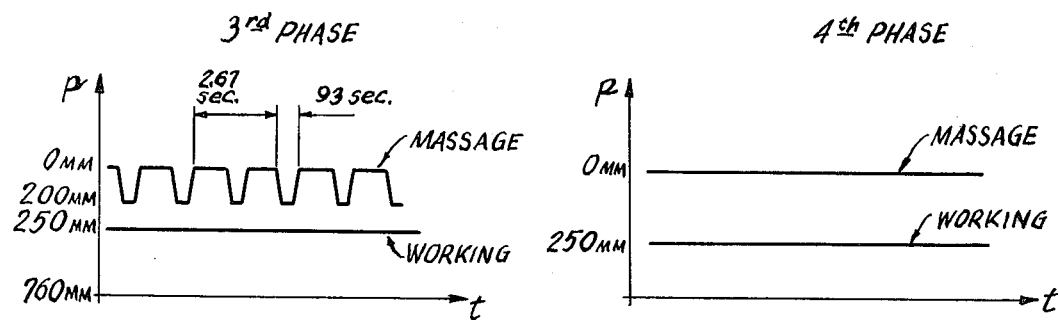
FIG. 12 is a diagram of the vacuums in a post-milking phase.
FIG. 13 is a diagram of the vacuums in a switch-off phase.

10 and the third phase diagram in FIG. 12 illustrate identical vacuums and pulsations.

Each teat cup 4-7 is independently subjected to a separate train of massage vacuum pulses through the action of its associated servo valve 44-47, pulsator 36-39 and the changer 32, responding to a train of control pulses from control means 16. Specifically, the control means 16 generates a separate train of control pulses over each line 52-55, each train corresponding to the massage pulse trains illustrated in FIGS. 10-12. As an example, the pulse train signal on line 52 into the solenoid 58 of pulsator 36 contains both high and low portions. A low signal leaves the solenoid deactivted, and atmospheric pressure is established in line 40 to the servo valve 47. In the servo valve 47 atmospheric pressure in line 40 allows the vacuum on line 34 to pull the piston 68 against aperture 70, sealing the aperture 70 and establishing atmospheric pressure for aperture 72 in line 51 to the teat cup 7. Atmospheric pressure in line 51 causes the liner 11 to collapse, establishing a rest configuration in the cup. Therefore, a low signal condition on line 52 from the control means 16 causes a rest configuration in the corresponding teat cup 7.

A high signal on line 52 activates the solenoid 58 of the pulsator 36, moving the valve 56 to seal aperture 62 and open aperture 64 establishing the 200 mm. vacuum from line 65 into line 40. In the servo valve 47, this 200 mm. vacuum in line 40 acts upon the diaphragm 66 to pull the piston 68 away from aperture 70, establishing the vacuum from line 34 into line 51 to the teat cup. This vacuum in line 51 causes the liner 11 to open, establishing a flow configuration in the cup. Therefore, a high signal condition on line 52 from the control means 16 causes a flow configuration in the corresponding teat cup.

The massage pulses for the rest and flow configurations in the teat cups 4-7 are accordingly controlled by the pulse signals on lines 52-55 from the control means 16. The magnitude of the massage vacuums are controlled by signal from the control means 16 over line 35 to changer 32, with a high signal present for the first and third phases and a low signal for the second phase. With reference to FIG. 2, a low level signal over line 35, as in the second phase, fails to activate solenoid 74, and the low vacuum in line 28 maintains a valve 77 in sealing contact with aperture 76, establishing the high vacuum from line 30 into line 34 and onto the servo valves 44-47. A high level signal over line 35, as in the first and third phases, activates solenoid 34, forcing valve 77 into sealing contact with aperture 78, establishing the low vacuum from line 28 into line 34 and onto the servo valves 44-47.

The magnitude of the working vacuums are controlled by signals from the control means 16 over line 22 to the regulator 20. A low level signal over line 22 activates the regulator and establishes the low vacuum level on the milk line. A high level signal establishes a high vacuum level on the milk line. Accordingly, a high vacuum level is established on the milk line for the second phase, with a low vacuum level for the first, third and fourth phases.

The teat cups 4-7 can be activated for simultaneous milking action, such as known in the art, where the liners are simultaneously in either a rest or flow configuration. Or the cups 4-7 can be activated for 2 by 2 action where pairs of the liners act together. In the preferred embodiment, however, the teat cups 4-7 are activated for sequential milking action where the teat cups are subjected independently to periodic pulses of the massage vacuum. In phases 1 and 3 the teat cup 7 associated with line 52 is activated initially, followed after a 0.5 second delay by teat cup 6, then by cup 5 after another 0.5 second delay, then by cup 4 after another 0.5 second delay, then by cup 4 after another 5 second delay, then by cup 7 after the delay, and so forth in sequence. In phase 2 the same sequence is followed, with 0.2 second delays in activation.

The schematic diagram of the system control means 16 of FIG. 6 contains several integrated circuit modules (IC's) as identified and known in the art. The oscillator 80 has IC 118; the counter 82 has IC's 120, 122 and 124; the PROM 92 has IC 126; the multiplexer 102 has IC 128; the control 86 has IC 130; the timer 112 has IC's 132 and 134; and the drivers have transistors 135-138. The control means 16 can place the counter 82, PROM 92, and multiplexer 102 in either a mode 1 or mode 2 condition of generating pulse trains over lines 52-55, as controlled by the control 86. The pulses generated under a mode 1 condition are used in the first and third phases of the milking machine system in the preferred embodiment, with the mode 2 pulses used in the second phase.

The control means is activated by a turn-on switch 131, which thereby supplies the power from the power supply 133 to activate the system in the first phase. In the first phase, the system begins in a mode 1 condition wherein oscillator 80 generates a 60 pulses per second signal, which is sent to IC 120 via line 140. IC 120 divides the 60 p/s signal by four, sending the 15 p/s output to pin 1 of IC 122 via line 142. IC 122 divides the 15 p/s signal by two, sending the 7.5 p/s output to pin 14 of IC 124 and to pin 10 of IC 126. IC 124 responds to the 7.5 p/s signal to generate a binary-coded-decimal (BCD) output signal out pins 1, 9, 8 and 11, with pin 1 representing the lowest position in the binary code and pin 11 the highest.

IC 126 receives the BCD signal from IC 124 at pins 14, 13, 12 and 11, and receives a 7.5 p/s signal at pin 10 from pin 15 of IC 122. In response to these signals, the PROM of IC 126 generates two separate sets of pulse train signals as known in the art. Set A signals are sent over lines 93-96, and comprise four sequential pulse trains. Set B signals are sent over lines 97-100 and also comprise four sequential pulse trains, although of a different pulse period and width. In mode 1, each train of pulses, such as on line 93, has a 2.67 second period and 0.93 second pulse width, with the trains of pulses being sequentially delayed by 0.5 seconds. Each set B pulse train, such as on line 97, has a 2.67 second period and a 1.74 second pulse width.

During mode 1, pin 13 of IC 130 in control 86 maintains a high signal, which is carried to selector pin 1 of IC 128 in the multiplexer 102, and to pin 10 of a NAND gate 144 in the counter 82. This high signal into pin 10 of gate 144 allows pulses from pin 7 of IC 120 to pass to its pin 10, causing IC 120 to be a divide-by-four circuit. The high signal at pin 1 of IC 128 causes the circuit to block the set B signals on lines 97-100, and to pass the set A signals from lines 93-96 onto output pins 4, 7, 9 and 12, and onto transistor drivers 135-138 via lines 107-110. The drivers 135-138 receive the signals on lines 107-110 and output amplified signals on lines 52-55 to drive the pulsators 36-39.

The condition of the vacuum regulator 20 is controlled by the signal present at output pin 158, which signal is carried to the regulator over line 22. In mode 1, the signal at the output pin 158 is low, as controlled by a high output from pin 13 of IC 130 shutting off driver 121.

The condition of the vacuum changer 32 is controlled by the signal present at output pin 160, carried to the changer over line 35. In mode 1, the signal at the output pin 160 is high, as controlled by a high signal input from pins 8 and 13 of IC 130 through NAND gate 150 and driver 151.

Control IC 130 will switch from mode 1 to mode 2 in response to either a signal from the flow indicator 14 that tha rate of milk flow has attained 0.2 kg/min., or a signal from the timer 112 that the predetermined period of time has elapsed. Specifically, when the rate of milk flow reaches 0.2 kg/min., the output on line 18 from the flow indicator 14 goes from its previous high signal to a low signal, which drives pin 5 on control IC 130 high and drives pin 6 of IC 122 low. The low signal at pin 6 of IC 122 drives outut pin 11 of IC 122 low, which low signal is input into pin 1 of IC 130, driving output pin 13 low, and output pin 12 high. Output pin 8 of IC 130 is also driven high. The low signal at pin 13 of IC 130 is present throughout mode 2 and causes the output at pin 158 to go high at the beginning of phase 2, resulting in a change in the level of working vacuum as discussed previously. Similarly, the low signals at pins 13 and 8 of IC 130 during mode 2 cause the output at pin 160, controlling the level of massage vacuum, to go low during mode 2, changing the level of massage vacuum.

The low signal out pin 13 of IC 130 is also carried to selector pin 1 of IC 128 in the multiplexer, causing the multiplexer to block the signals on lines 93–96 and to pass the signals on lines 97–100. This low signal out pin 13 of IC 130 is also carried to gate 144 to block any pulses from pin 7 of IC 120 into pin 10 of IC 120, thereby causing IC 120 to become a divide-by-three counter.

As a divide-by-three counter in mode 2, IC 120 receives the 60 p/s signal from IC 118 and generates a 20 p/s signal to pin 1 of IC 122, where it is divided by two. The resulting 10 p/s signal is carried to pin 14 of IC 124 and to pin 10 of IC 126. IC 124 responds by generating a BCD signal to pins 14, 13, 12 and 11 of IC 126. In response to the signals at pins 10, 14, 13, 12 and 11, IC 126 generates two separate sets of pulse train signals similar to mode 1. Set C signals are sent over lines 93–96 and comprise four sequential pulse trains, each train of pulses having a 2 second period and a 0.7 second pulse width. Set D signals are sent over lines 97–100 and also comprise four sequential pulse trains, each train of pulses having a 2 second period and a 1.3 second pulse width, with a 0.25 second delay between pulse trains. As indicated previously, the low signal input to pin 1 of IC 128 in mode 2 causes IC 128 to block the set C signals and to pass the set D signals on lines 97–100, outputing the signals onto drivers 135–138 via lines 107–110. The drivers 135–138 receive the signals and output amplified signals on lines 52–55 to drive the pulsators 36–39.

Control 12 will also switch from mode 1 to mode 2 in response to a signal from the timer 112 that the predetermined period of time has elapsed. In the preferred embodiment of FIG. 6, the control 12 will switch from mode 1 to mode 2 after 61 seconds has elasped in mode 1 operation, unless the flow indicator 14 has previously caused the system to switch as a result of the rate of milk flow having reached 0.2 kg/min.

In calculating the lapse of time in mode 1, the output of pin 11 of IC 124 is a pulse train of 1.33 second period and 0.267 second pulse width. This pulse train is conducted through AND gate 133 into pin 14 of IC 134, which counts the inputed pulses and outputs their sum in binary code at pins 1, 9, 8 and 11. The 11 pin of IC 134 represents the sum of 8, and the signal at that pin is conducted into pin 14 of IC 132, which counts the inputed pulses and outputs their sum in binary code at pins 1, 9, and 8, e.g. an output at pin 9 represents the sum of 32. The outputs pins 9, 8, and 11 of IC 134 and pin 9 of IC 132 are conducted to NAND gate 146. Accordingly, when IC 132 and 134 reach the sum of 46, all outputs to gate 146 are high and a low signal is generated at the output 148 of the gate 146. This output signal represents the time lapse of 61 seconds (46 × 1.33 = 61), and is conducted to pin 8 of IC 122, causing pin 11 of IC 122 to go low. This low signal from pin 11 of ICC 122 is input into pin 1 of IC 130, causing the system to change into mode 2 as discussed above.

As seen above, the system can be shifted from its first phase, in a mode 1 condition, to a second phase, in a mode 2 condition, by either the rate of milk flow reaching a 0.2 kg/min. level, or by the lapse of 61 seconds. The system of the preferred embodiment will remain in this second phase until the rate of milk flow has diminished to the 0.2 kg/min. level, at which point the system will be switched into a third phase.

During the second phase of milking, the system is operated in a mode 2 condition, with a high, 380 mm. level of workin- vacuum as controlled by a high signal on line 22, and sequential pulses of a high, 380 mm. level of massage vacuum as controlled by a low signal on line 35 and pulse signals on lines 52–55. The system will remain in this second phase until the level of milk flow diminishes to the 0.2 kg/min. rate, whereupon the detector 14 indicates this condition by driving the signal on line 18 to a high level.

This high signal triggers gate 156 to drive pin 5 of IC 130 low, and drives pin 6 of IC 122 high. In IC 130, pin 8 is driven high, pin 2 is driven low, pins 9 and 12 are driven low, and pin 13 is driven high. The system has now been returned to its mode 1 operation wherein the high signal from pin 13 of IC 130 is input at pin 1 of IC 128 and pin 10 of gate 144, with the multiplexer IC 128 set to pass set A signals only, and IC 120 reset to become a divide-by-four circuit. The high signals at pins 8 and 13 of IC 130 also cause the vacuum levels to return to their mode 1 condition, with the signal on line 22 going low and the signal of line 35 going high. The low signal at pin 12 of IC 130 resets the counter IC's 132 and 134.

This third phase is similar with respect to the first phase of the milking operation in terms of the vacuum levels and massage pulses employed, as seen in FIG. 12. Since this third phase serves as a post-milking operation, the level of working vacuum is reduced to 250 mm., with the massage vacuum being reduced to 200 mm. and the pulses being of a shorter period and length as in phase 1. This third phase continues for a duration of 106.7 seconds, until pins 1 and 8 of IC 132 go high, indicating a binary count of 80 (80 × 1.33 seconds = 106.4 seconds). This causes the output of gate 162 to go low, driving the system from its third phase into its fourth phase.

When the output of gate 162 goes low, as the system goes into its fourth phase, input pin 15 of IC 128 is driven high, deactivating IC 128 so that no further pulses are passed from IC 126 onto lines 52–55. Since there are no pulses on lines 52–55, the liners of the teat cups 4–7 are maintained at atmospheric pressure. The output of pin 13 of IC 130 remains high, resulting in the working vacuum applied to the teat cups remaining at the 250 mm. level. Under this condition of a working vacuum of 250 mm. and no massage vacuum, the teat cup liners, such as liner 8, collapse and the teat cup is held onto the cow with no milking action occurring. The system will remain in this quiescent, fourth phase until the system is manually deactivated by opening switch 131 of the power supply 133, and the teat cups are released from the cow.

We claim:
1. A milking machine system comprising:
   a cluster of teat cups having teat-receiving liners;
   a milk line for receiving milk from the cluster;
   a flow rate sensing device associated with the milk line for sensing the rate of milk flow within the line;
   a timing device for measuring lapses of predetermined periods of time;
   first vacuum means connected to the milk line for creating a working vacuum in the teat cups;
   second vacuum means connected to the teat cups for creating a massage vacuum;
   pulsator means associated with the teat cups for creating periodic pulses of the massage vacuum; and
   system control means operatively connected to the flow rate sensing device and to the timing device for controlling the character of the working and massage vacuums applied to the teat cups in response to the rate of milk flow within the milk line and in response to the lapses of the predetermined periods of time.
2. The milking machine system as claimed in claim 1 and wherein:
   the first vacuum means comprises regulator means for providing a variable working vacuum;
   the second vacuum means comprises means providing a variable massage vacuum;
   the pulsator means comprises means for varying the pulse frequency and duration; and
   the system control means comprises means responsive to the flow rate sensing device and to the timing device for providing to the teat cups in a first phase a working vacuum at a first level and a massage vacuum at a first level and at a first pulse frequency and duration; means responsive to the flow rate sensing device for providing to the teat cups in a second phase a working vacuum at a second level and a massage vacuum at a second level and at a second pulse frequency and duration; means responsive to the timing device for providing to the teat cups in a third phase a working vacuum at a third level and a massage vacuum at a third level and at a third pulse frequency and duration; and means for providing to the teat cups in a fourth phase a working vacuum at a fourth level.
3. The milking machine system as claimed in claim 1 and wherein:
   the first vacuum means comprises regulator means for providing a variable level working vacuum;
   the second vacuum means comprises means providing a variable level massage vacuum;
   the pulsator means comprises means for varying the pulse frequency and duration; and
   the system control means comprises means responsive to the flow rate sensing device and to the timing device for providing to the teat cups in a plurality of phases a working vacuum of variable level, and a massage vacuum of variable level and variable pulse frequency and duration.
4. The milking machine system as claimed in claim 1 and wherein:
   the first vacuum means comprises regulator means for providing a high and a low level working vacuum;
   the second vacuum means comprises means providing a high and a low level massage vacuum;
   the pulsator means comprises means providing a first pulse train of first pulse frequency and duration and a second pulse train of second pulse frequency and duration; and
   the system control means comprises means responsive to the flow rate sensing device and to the timing device for providing to the teat cups in a first phase a working vacuum at the low level and a massage vacuum at the low level and at the first pulse frequency and duration; means responsive to the flow rate sensing device for providing to the teat cups in a second phase a working vacuum at the high level and a massage vacuum at the high level and at the second pulse frequency and duration; means responsive to the timing device for providing to the teat cups in a third phase a working vacuum at the low level and a massage vacuum at the low level and at the first pulse frequency and duration; and means for providing to the teat cups in a fourth phase a working vacuum at the low level.
5. The milking machine system as claimed in claim 1 and wherein:
   the first vacuum means comprises regulator means for providing a variable level of working vacuum;
   the second vacuum means comprises means for providing a variable level of massage vacuum;
   the pulsator means comprises means for varying the pulse frequency and duration; and
   the system control means comprises means responsive to the flow rate sensing device and to the timing device for subjecting the cups sequentially to periodic pulses of the massage vacuum.
6. A milking machine system comprising a cluster of teat cups having teat-receiving liners;
   a milk line for receiving mil from the cluster;
   first vacuum means connected to the milk line for creating a variable level working vacuum in the teat cups;
   second vacuum means connected to the teat cups for creating a variable level of massage vacuum;
   pulsator means associated with the teat cups for subjecting the cups to periodic pulses of the massage vacuum variable in pulse frequency and duration;
   a flow rate sensing device associated with the milk line for sensing the rate of milk flow within the line;
   a timing device for measuring lapses of predetermined periods of time; and
   system control means operatively connected to the flow rate sensing device and to the timing device for controlling the character of the working and massage vacuums applied to the teat cups in a plurality of operational phases; the system control means being responsive to the timing device in one of the phases for providing to the teat cups a working vacuum at a first level and a massage vacuum at a first level and at a first pulse frequency and dura- tion; and the system control means being responsive to the flow rate sensing device in another of the phases for providing to the teat cups a working vacuum at a second level and a massage vacuum at a second level and at a second pulse frequency and duration.

7. The milking machine system as claimed in claim 6 and wherein:
the pulsator means comprises means for subjecting each teat cup independently to periodic pulses of the massage vacuum; and
the system control means comprises means for controlling the pulsator means to subject the teat cups sequentially to periodic pulses of the massage vacuum.

8. The milking machine system as claimed in claim 6 and wherein:
the first vacuum means comprises regulator means for providing a high and a low level working vacuum;
the second vacuum means comprises means providing a high and a low level massage vacuum;
the pulsator means comprises means providing a first pulse train of first pulse frequency and duration and a second pulse train of second pulse frequency and duration; and
the system control means comprises means responsive to the flow rate sensing device and to the timing device for providing to the teat cups in a first phase a working vacuum at the low level and a massage vacuum at the low level and at the first pulse frequency and duration; means responsive to the flow rate sensing device for providing to the teat cups in a second phase a working vacuum at the high level and a massage vacuum at the high level and at the second pulse frequency and duration; means responsive to the timing device for providing to the teat cups in a third phase a working vacuum at the low level and a massage vacuum at the low level and at the first pulse frequency and duration; and means for providing to the teat cups in a fourth phase a working vacuum at the low level.

9. The milking machine system as claimed in claim 6 and wherein:
the pulsator means comprises means for subjecting each teat cup independently to periodic pulses of the massage vacuum; and
The system control means comprises means for controlling the pulsator means to subject the teat cups sequentially to periodic pulses of the massage vacuum, the system control means being responsive to the flow rate sensing device and to the timing device for providing to the teat cups in a first phase a working vacuum at a first level and a massage vacuum at a first level and at a first pulse frequency and duration; means responsive to the flow rate sensing device for providing to the teat cups in a second phase a working vacuum at a second level and a massage vacuum at a second level and at a second pulse frequency and duration; means responsive to the timing device for providing to the teat cups in a third phase a working vacuum at a third level and a massage vacuum at a third level and at a third pulse frequency and duration; and means for providing to the teat cups in a fourth phase a working vacuum at a fourth level.

10. A milking machine system comprising:
a cluster of teat cups having teat-receiving liners;
a milk line for receiving milk;
a flow rate sensing device associated with the milk line for sensing the rate of milk flow within the line;
a timing device for measuring lapses of predetermined periods of time;
first vacuum means connected to the milk line for creating a working vacuum in the teat cups;
second vacuum means connected to the teat cups for creating a massage vacuum;
pulsator means associated with the teat cups for subjecting each teat cup independently to periodic pulses of the massage vacuum; and
system control means for controlling the pulsator means to subject the teat cups sequentially to periodic pulses of the massage vacuum, the system control means comprising means operatively connected to the flow rate sensing device and to the timing device for controlling the character of the working and massage vacuums applied to the teat cups in response to the rate of milk flow within the milk line and in response to the lapses of predetermined periods of time.

11. The milking machine system as claimed in claim 10 and wherein:
the first vacuum means comprises regulator means for providing a variable working vacuum;
the second vacuum means comprises means providing a variable massage vacuum;
the pulsator means comprises means for varying the pulse frequency and duration; and
the system control means comprises means responsive to the flow rate sensing device and to the timing device for providing to the teat cups in a first phase a working vacuum at a first level and a massage vacuum at a first level and at a first pulse frequency and duration; means responsive to the flow rate sensing device for providing to the teat cups in a second phase a working vacuum at a second level and a massage vacuum at a second level and a second pulse frequency and duration; means responsive to the timing device for providing to the teat cups in third phase a working vacuum at a third level and a massage vacuum at a third level and at a third pulse frequency and duration; and means for providing to the teat cups in a fourth phase a working vacuum at a fourth level.

12. The milking machine system as claimed in claim 10 and wherein:
the first vacuum means comprises regulator means for providing a high and a low level working vacuum;
the second vacuum means comprises means providing a high and a low level massage vacuum;
the pulsator means comprises means providing a first pulse train of first pulse frequency and duration and a second pulse train of second pulse frequency and duration; and
the system control means comprises means responsive to the flow rate sensing device and to the timing device for providing to the teat cups in a first phase a working vacuum at the low level and a massage vacuum at the low level and at the first pulse frequency and duration; means responsive to the flow rate sensing device for providing to the teat cups in a second phase a working vacuum at the high level and a massage vacuum at the high level and at the second pulse frequency and duration; means responsive to the timing device for providing to the teat cups in a third phase a working vacuum at the low level and a massage vacuum at the low level and at the first pulse frequency and duration; and means for providing to the teat cups in a fourth phase a working vacuum at the low level.

13. A milking machine system comprising:
a cluster of teat cups having teat-receiving liners;
a milk line for receiving milk;
first vacuum means connected to the milk line for creating a working vacuum in the teat cups;
second vacuum means connected to the teat cups for creating a massage vacuum;
pulsator means associated with the teat cups for subjecting the cups to periodic pulses of the massage vacuum;
a system control means for controlling the duration and character of the working and massage vacuums applied to the teat cups by providing to the teat cups in a first phase a working vacuum at a first level and a massage vacuum at a first level and at a first pulse frequency and duration; by providing to the teat cups in a second phase a working vacuum at a second level and a massage vacuum at a second level and at a second pulse frequency and duration; by providing to the teat cups in a third phase a working vacuum at a third level and a massage vacuum at a third level and at a third pulse frequency and duration, and by providing to the teat cups in a fourth phase a working vacuum at a fourth level.

14. The milking machine system as claimed in claim 3 and wherein:
the system comprises a flow rate sensing device associated with the milk line for sensing the rate of milk flow within the line; and
the system control means comprises means responsive to the flow rate sensing device for controlling the duration of at least one of the operational phases.

15. The milking machine system as claimed in claim 13 wherein:
the system comprises a timing device for measuring lapses of predetermined periods of time; and
the system control means comprises means responsive to the flow rate sensing device for controlling the duration of at least one of the operational phases.

16. The milking machine system as claimed in claim 13 and wherein the system comprises:
a flow rate sensing device associated with the milk line for sensing the rate of milk flow within the line;
a timing device for measuring lapses of predetermined periods of time; and wherein
the system control means comprises means operatively connected to the flow rate sensing device and to the timing device for controlling the character of the working and massage vacuums applied to the teat cups in response to the rate of milk flow within the milk line and in response to the lapses of predetermined periods of time.

17. The milking machine system as claimed in claim 13 and wherein:
the first vacuum means comprises regulator means for providing a variable working vacuum;
the second vacuum means comprises means providing a variable massage vacuum; and
the pulsator means comprises means for varying the pulse frequency and duration.

18. The milking machine system as claimed in claim 13 and wherein:
the pulsator means comprises means associated with the teat cups for subjecting each teat cup independently to periodic pulses of the massage vacuum; and
the system control means comprises means for controlling the pulsator means to subject the teat cups sequentially to periodic pulses of the massage vacuum.

* * * * *

UNITED STATES PATENT OFFICE
CERTIFICATE OF CORRECTION

PATENT NO. : 4,011,838
DATED : March 15, 1977
INVENTOR(S) : SVEN-AKE NORDEGREN and DOUGLAS J. NORTON It is certified that error appears in the above-identified patent and that said Letters Patent are hereby corrected as shown below:

Col. 2, line 40; delete second occurrence of "in".

Col. 4, line 12; delete second occurrence of "the".

Col. 10, line 6; delete "then by cup 4 after another 5 second delay".

Col. 11, line 12; "tha" should read --the--.

Col. 12, line 31; "workin-" should read --working--.

Col. 17, line 36; "3" should read --13--.

Signed and Sealed this

Fourth Day of April 1978

[SEAL]

Attest:

RUTH C. MASON
Attesting Officer

LUTRELLE F. PARKER
Acting Commissioner of Patents and Trademarks